United States Patent [19]
Kasuya

[11] 4,111,598
[45] Sep. 5, 1978

[54] TURBINE CASING FOR SUPERCHARGERS

[75] Inventor: Tamotsu Kasuya, Oyama, Japan

[73] Assignee: Kabushiki Kaisha Komatsu Seisakusho, Tokyo, Japan

[21] Appl. No.: 717,616

[22] Filed: Aug. 25, 1976

Related U.S. Application Data

[63] Continuation-in-part of Ser. No. 536,195, Dec. 24, 1974, abandoned.

[30] Foreign Application Priority Data

Apr. 30, 1974 [JP] Japan .................................. 49-47552

[51] Int. Cl.² .......................... F01D 25/24; F02B 37/02
[52] U.S. Cl. ..................................... 415/202; 415/203; 415/219 C; 417/407; 60/605
[58] Field of Search ............... 415/205, 204, 202, 184, 415/185, 219 C, 203; 417/405, 406, 407; 60/605, 597

[56] References Cited

U.S. PATENT DOCUMENTS

| | | |
|---|---|---|
| 3,218,029 | 11/1965 | Woollenweber, Jr. ............ 415/205 X |
| 3,557,549 | 1/1971 | Webster ................................ 415/205 |
| 3,614,259 | 10/1971 | Neff ........................................ 415/205 |
| 3,687,233 | 8/1972 | Greenwald ..................... 417/407 UX |

FOREIGN PATENT DOCUMENTS 1,220,175  1/1971  United Kingdom ..................... 415/205

OTHER PUBLICATIONS

Ludewig, "Schwingungsuntersuchungen an Turbinenschaufeln von Abgasturbaladern", MTZ 29 (1968) 10, p. 411.

Primary Examiner—Carlton R. Croyle
Assistant Examiner—Donald S. Holland
Attorney, Agent, or Firm—Armstrong, Nikaido, Marmelstein & Kubovcik

[57] ABSTRACT

A turbine casing for superchargers having a baffle wall formed therewithin with the inclination inclined at about 30° to 35° relative to a perpendicular to the axis of a turbine impeller so that the inside of the turbine casing is formed into two flow paths where the exhaust pressure wave is passed through. One of the flow paths has on the side wall thereof opposite to the baffle wall an inclined surface inclined at about 10° to 15° relative to the perpendicular in an opposite direction to the inclination of the baffle wall. The other flow path has on the side surface thereof opposite to the baffle wall an inclined surface inclined at about 55° to 60° relative to the perpendicular in the same direction as the inclination of the baffle wall. Each flow path is uniform in cross section throughout its entire volute.

3 Claims, 4 Drawing Figures

TURBINE CASING FOR SUPERCHARGERS

BACKGROUND OF THE INVENTION

This is a continuation in part application of the Ser. No. 536,195 filed on Dec. 24, 1974, now abandoned.

This invention relates to a turbine casing for use in superchargers.

A conventional turbine casing for use in radial flow type exhaust turbine superchargers wherein the pulsation in engine exhaust pressure is utilized comprises, as shown in FIGS. 1 and 2, a baffle wall a disposed at right angles to a turbine impeller b.

In this type of exhaust turbine superchargers, when the engine is ignited in sequence from No. 1 cylinder to No. 4 cylinder, the exhaust pressure wave flows as shown by c and d in FIG. 1. Then, because of the baffle wall a being disposed in close proximity to the turbine impeller b, the exhaust pressure wave cannot strike against the whole surface of the turbine impeller b in the inlet portion thereof so that only a part of the turbine impeller b can be effectively utilized whereby satisfactory performance as a reaction turbine could not be developed.

Other types of turbine casings are disclosed such as in U.S. Pat. Nos. 3,614,259 to Neff; 3,664,761 to Zastrow; or British Pat. No. 1,220,175.

SUMMARY OF THE INVENTION

It is therefore an object of the present invention to provide a turbine casing with configuration capable of using exhaust gas energy efficiently.

Another object of the present invention is to provide a turbine casing arrangement wherein the exhaust pressure wave through the flow path acts on the whole region of the inlet part of the turbine impeller.

The present invention is directed to an improvement in a turbine casing for a supercharger including a turbine inlet casing, a baffle wall formed within the turbine inlet casing and a turbine impeller. The improvement comprises two flow paths within the inlet casing for an exhaust pressure wave, each flow path being uniform throughout its entire volute. The flow paths are formed by the side walls of the casing and the baffle wall which is positioned between the side walls and is inclined relative to a perpendicular to the axis of the turbine impeller. One of the flow paths includes a portion of one of the side walls opposite the baffle wall, which is inclined relative to the perpendicular in an opposite direction to the inclination of the baffle wall, and the other flow path includes a portion of a second one of the side walls opposite the baffle wall, which is inclined relative to the perpendicular in the same direction as the baffle wall.

The two flow paths join together within the casing at a point which is substantially separated from the turbine impeller, thereby forming a common area between the flow paths and the impeller.

The narrowest point in the common area is at the end of the area adjacent to the impeller.

One of the essential features of the present invention is the formation of the two flow paths which are uniform in cross section throughout their entire length with the common area being positioned between the two flow paths and the impeller in combination with the baffle wall. A further essential feature resides in the fact that the narrowest point in the common area is at the end of the common area adjacent to the impeller.

With the above configuration, an exhaust pressure wave through the flow paths acts on the whole region of the inlet part of the turbine impeller, thereby making best use of the energy of the exhaust gas.

Other objects, features and advantages of the present invention will be readily apparent from the following description taken in conjunction with the accompanying drawings.

DETAILED DESCRIPTION OF THE PREFERRED EMBODIMENT

Figure 1:
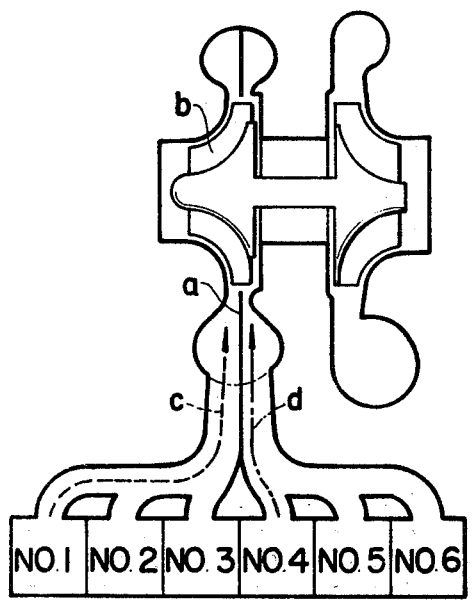
FIG. 1 is a schematic longitudinal sectional view of a supercharger having a conventional type turbine casing.
Figure 2:
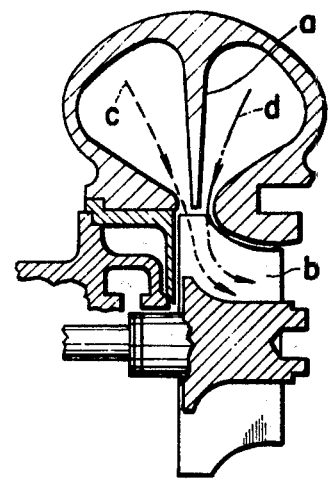
FIG. 2 is a fragmentary longitudinal sectional view of the turbine casing shown in FIG. 1.
Figure 3:
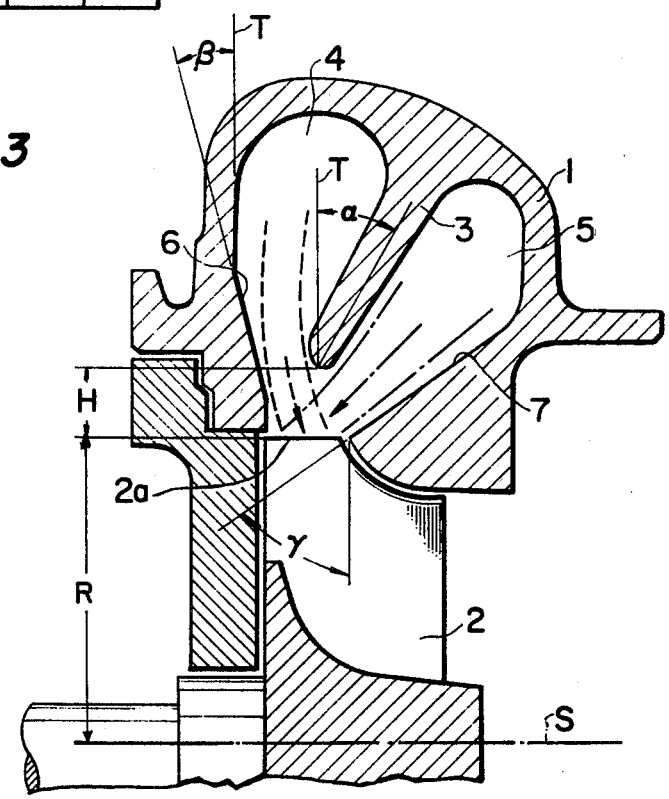
FIG. 3 is a fragmentary longitudinal sectional view of one embodiment of the present invention.

Referring to FIG. 3 reference numeral 1 denotes a turbine inlet casing and 2 denotes a turbine impeller.

The turbine inlet casing has inside thereof a baffle wall 3 forming flow paths 4 and 5. The flow paths 4 and 5 are uniform in cross section throughout their entire volutes. That is, the flow paths 4 and 5 formed by inner walls of the turbine inlet casing 1 and baffle wall 3 encircle the centrally located turbine impeller 2, a cross section of the flow paths 4 and 5 would be identical anywhere along the length of the paths. The baffle wall 3 is inclined at an angle of $\alpha$ relative to a perpendicular T which is at right angles to the axis S of the turbine impeller 2, the value of $\alpha$ being approximately 30° to 35°. The tip of the baffle wall 3 is disposed from inlet part 2a of the turbine impeller 2 at a space interval of H which ranges from 8 to 30 mm. The space between the tip or extreme point or distal end of the baffle wall 2 and the inlet part 2a of the turbine impeller forms a common area between the flow paths 4 and 5 and the impeller. The inner wall of the flow path 4 has an inclined surface 6 formed at an inclination of $\beta$ relative to the perpendicular T, the valve of $\beta$ being approximately 10° to 15°, while the inner wall of the flow path 5 has an inclined surface 7 formed at an inclination of $\gamma$ relative to the perpendicular T, the valve of $\gamma$ being approximately 55° to 60°.

Such being the arrangement, the exhaust pressure wave which made its entry into the flow path 4 collides against the inclined surface 6 and is then guided by the surface 6 and the baffle wall 3 so as to act on the whole region of the inlet part 2a of the turbine impeller 2.

While the exhaust pressure wave which made its entry into the flow path 5 in successive explosion stroke strikes against the inclined surface 7, and is, then guided by the surface 7 and the baffle wall 3 to act on the whole region of the inlet part 2a of the turbine impeller 2 in the similar manner.

Figure 4:
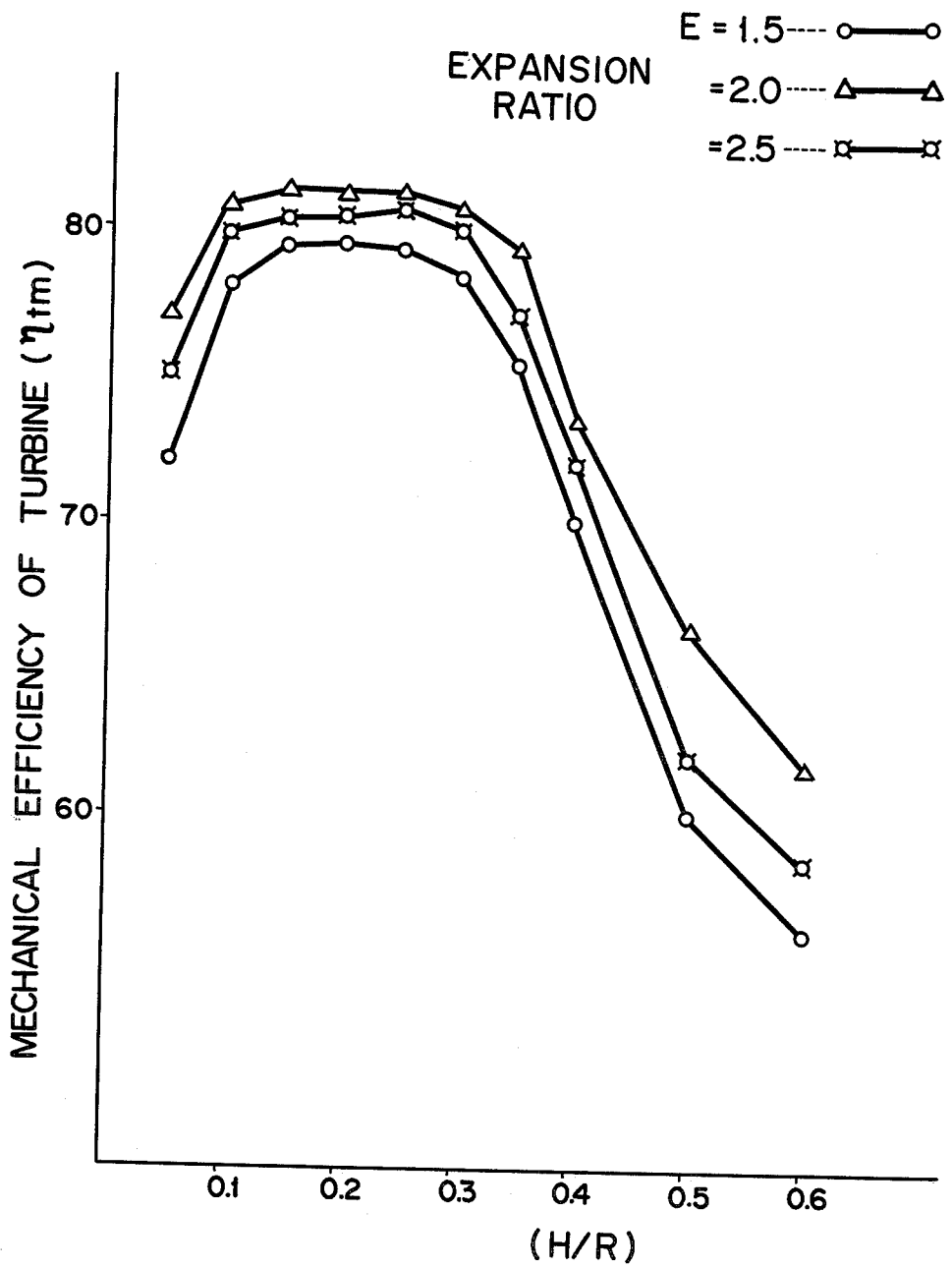
FIG. 4 is a graph showing mechanical efficiency of the turbine with respect to H/R wherein H is a space between the extreme point of the baffle wall and the inlet part of the impeller and R is a space from the inlet part of the impeller to the center axis S thereof.

Referring to FIG. 4, it is understood that the mechanical efficiency of the turbine is maintained at high level when H/R is from 0.1 to 0.3. When H/R is in the above range, gas flow can be utilized effectively. Inclined angle of each wall is also significant in utilizing kinetic energy of gas flow. The expansion ratios referenced in the drawing refer to the ratio of the pressure at the inlet of the turbine to the pressure at the outlet of the turbine.

With maintaining H/R from 0.1 to 0.3 coupled with specific wall inclinations, gas flow from each flow paths 4 and 5 can hit the entire region of the inlet part of the turbine impeller 2 thereby making it possible to utilize the energy of exhaust gas fully.

What is claimed is:

1. In a turbine casing for superchargers including a turbine inlet casing, a baffle wall formed within the turbine inlet casing and a turbine impeller, said turbine impeller having an axis of rotation, the improvement comprising two flow paths within said inlet casing for an exhaust pressure wave, each flow path being uniform in cross section throughout its entire voluted length, said flow paths being formed by the inner wall surfaces of said casing and said baffle wall positioned therebetween, said baffle wall being inclined relative to the perpendicular to the axis of rotation of said turbine impeller, wherein one of said flow paths includes a portion of one of said inner wall surfaces opposite said baffle wall which is inclined relative to said perpendicular in a direction opposite to the inclination of said baffle wall and the other of said flow paths includes a portion of a second one of said inner wall surfaces opposite said baffle wall which is inclined relative to said perpendicular in the same direction as said baffle wall, said two flow paths joining together within said casing at a point substantially separated from said turbine impeller, that is, at a distance of at least 10% of the length of the impeller radius, and forming a common area between said flow paths and said impeller, the narrowest point in said common area being where the common area stops, that is, immediately adjacent to said impeller, wherein the baffle wall has a distal end and the impeller has an inlet part, wherein H/R is from 0.1 to 0.3 where H is a space between the distal end of the baffle wall and the inlet part of the impeller and R is a space from the inlet part of the impeller to the center of the axis of rotation thereof, said baffle wall being inclined at approximately 30° to 35° relative to said perpendicular, said inclined surface of said one of said flow paths being inclined at approximately 10° to 15° relative to said perpendicular, and said inclined surface of said other flow path being inclined at approximately 55° to 60° relative to said perpendicular.

2. The turbine casing of claim 1, wherein the distal end of said baffle wall is at a distance of 8 to 30 mm from said turbine impeller.

3. The turbine casing of claim 1, wherein the cross sectional area of said two flow paths is equal throughout their length.

* * * * *